Patented Aug. 20, 1946

2,405,967

UNITED STATES PATENT OFFICE 2,405,967

PREPARATION OF ACIDS AND ESTERS THEREOF

Donald J. Loder, Wilmington, Del., assignor to E. I. du Pont de Nemours & Company, Wilmington, Del., a corporation of Delaware No Drawing. Application April 21, 1944, Serial No. 532,661

8 Claims. (Cl. 260—484)

This invention relates to the synthesis of aliphatic dicarboxylic acids and their esters, and more particularly to the synthesis of diglycolic acid and its esters by the addition of carbon monoxide to an (alkoxymethoxy) substituted acetic acid.

Diglycolic acid is referred to in the literature as being formed theoretically by the elimination of one mole of water from the alcoholic hydroxyls of two moles of glycolic acid and as having the formula $O(CH_2COOH)_2$. It has been obtained in accord with the art by boiling mono chloracetic acid with lime. It forms large rhombic prisms and is a dibasic acid.

An object of the present invention is to provide an improved process for the preparation of aliphatic dicarboxylic acids and their esters. Another object is to provide a process for the preparation of aliphatic dicarboxylic acid ester by the addition of carbon monoxide to a formal-substituted aliphatic carboxylic acid ester. Yet another and more specific object is to provide a process for the preparation of the ester of diglycolic acid by the addition of carbon monoxide in the presence of a suitable catalyst to an alkyl ester of an (alkoxymethoxy) acetic acid. Still another object is to provide reaction conditions for effecting the synthesis. Other objects and advantages of the invention will hereinafter appear.

The process of the invention involves in its broadest aspects the addition of carbon monoxide to a formal-substituted aliphatic carboxylic acid ester. In accord with its more specific aspects, it may be realized by charging a pressure-resisting vessel with an (alkoxymethoxy) acetic acid ester and a suitable acid catalyst, introducing carbon monoxide into the vessel and subsequently effecting the reaction by the application of heat and pressure whereby a condensation between the ester and carbon monoxide will result, giving as a product of the reaction a diester of diglycolic acid.

The esters that can be condensed with carbon monoxide include all the esters of formal-substituted carboxylic acids, and as examples of such esters there may be more specifically designated the (alkoxymethoxy) carboxylic acid esters such as the esters of acids having the formula $ROCH_2OR_1COOH$, in which R is an alkyl group and $R_1$ a straight or branch chain hydrocarbon group. More specific examples of these acids are methoxy, ethoxy, iso and normal propoxy, iso and normal butoxy, and the higher (alkoxymethoxy) acetic, propionic, and higher straight and branch chain aliphatic organic acids.

Any suitable ester of the above designated acids may be employed, and as examples of such esters are more particularly designated the lower alkyl esters such as the methyl, ethyl, normal and isopropyl, normal and isobutyl esters, although the higher straight and branched chain alkyl esters thereof may be used.

Inasmuch as the product resulting from the reaction of the (alkoxymethoxy) carboxylic acid ester is a diester and as it is usually desirable to convert these diesters to the corresponding acids by hydrolysis, the process is simplified if the R group of the compound, such as is described by the formula given above, is the same as the esterifying group of the acid. If they are the same, only a single alcohol will be split off during the hydrolysis, while if the groups are different, a mixture of alcohols will be split off which are obviously more difficult to separate. Nevertheless, in so far as the operability of the process is concerned, it is immaterial whether these groups are similar or dissimilar. The (alkoxymethoxy) acetic acids and their esters are prepared in accord with the process described in the D. J. Loder U. S. Patent 2,250,487.

Catalysts of an acidic nature are preferred, and more particularly those which are especially active in promoting the synthesis of aliphatic acids in accord with the known processes of preparing those acids by the interaction of aliphatic alcohols with carbon monoxide. A number of catalysts which are suitable include, for example, the inorganic acids and more especially hydrochloric acid, sulfuric acid, phosphoric acid, tungstic acid; inorganic acidic salts, such for example as potassium acid sulfate, sodium acid phosphate, boron fluoride, and generally the acidic catalysts designated in the patents of A. T. Larson, J. C. Woodhouse, and G. B. Carpenter, Nos. 2,037,654; 2,053,233, and 1,924,766 respectively.

These catalysts may be used in amounts ranging up to one mole thereof per mole of the ester or acid reacted, the inorganic acid catalyst generally being used in smaller amounts ranging from 0.2 to 5.0%, while the boron fluoride catalysts and especially hydrated forms of boron fluoride containing from 0.5 mole to 5.0 moles of water per mole of boron fluoride may be employed in substantially equimolar proportions with the acid or ester reacted.

The carbon monoxide required for the synthesis may be conveniently derived from various commercial sources as, for example, water gas, producer gas and so forth, by liquefaction and other methods and for best results should be relatively pure. The carbon monoxide should preferably be present in sufficient excess to insure an adequate supply thereof for absorption by the ester treated.

The reaction proceeds at ordinary pressures, although it is advantageous to use pressures in excess of atmospheric, say from 5 to 1500 atmospheres or more, and preferably between 600 and 1000 atmospheres. A wide range of temperatures may be used, although the optimum temperature varies with specific conditions depending inter alia upon the relative concentration of the catalysts and pressures employed. Generally, the reaction can be carried out satisfactorily at temperatures ranging from 20 to 350° C., although temperatures ranging from 20 to 125° C. have been found preferable. Mild cooling means should generally be provided to maintain the temperature within the selected range.

The reaction product consists essentially of a solution containing the esters of diglycolic acid, methoxyacetic acid, hydroxyacetic acid, and higher boiling liquid residues. The esters are first fractionated and the diester of glycolic acid separated. The high-boiling fraction may, if desired, be treated by boiling under pressure, if desired, with an alcohol such as methanol, ethanol, or the like containing about 5 to 15% sulfuric acid, the reaction being carried out for about one hour. The thus treated products are neutralized with a base and the product distilled for recovery of the diglycolic acid ester contained therein.

The examples illustrate preferred embodiments of the invention, wherein parts are by weight unless otherwise indicated:

*Example 1.*—A mixture containing 200 parts of (methoxy-methoxy) acetic acid methyl ester and 20 parts of boron trifluoride is processed at a temperature between 75 and 100° C. and a CO pressure between 200 and 700 atmospheres for approximately 25 minutes in a silver-lined shaker tube. The pressure is released and 254.8 parts of a light brown liquid is washed from the shaker tube with ether and treated with sodium carbonate to destroy the boron trifluoride. After removal of the ether, 200 parts of methanol containing one part of sulfuric acid is added and the mixture boiled for one hour. The sulfuric acid is then neutralized with sodium methoxide as determined by a litmus indicator. Distillation under reduced pressure gives (1) 83.5 parts of methoxyacetic acid methyl ester and methyl glycolate, (2) 96 parts of dimethyl diglycolate and (3) 49 parts of a higher liquid boiling residue. Fraction (3) is further esterified by boiling with 200 parts of methanol containing 2 parts of sulfuric acid for one hour. This product is treated with sodium methoxide to neutralize the sulfuric acid with a litmus indicator, the mixture is distilled under reduced pressure giving (1) 14 parts of methyl methoxyacetate and methyl glycolate, (2) 24 parts of diglycolic acid dimethyl ester, and (3) 9 parts of higher boiling reactants. The total conversion to dimethyl diglycolate is 110 parts or 49.6%.

*Example 2.*—The process of Example 1 is duplicated for the condensation of carbon monoxide with ethyl (ethoxymethoxy) acetate, isopropyl (isopropoxymethoxy) acetate, and with isobutyl (isobutoxymethoxy) acetate, whereby there are obtained diethyl, diisopropyl, diisobutyl, diglycolates respectively. If methyl (carbomethoxydimethoxy) acetate, $$[CH_2(OCH_2OCH_2COOCH_3) COOCH_3]$$

is condensed with carbon monoxide, an unsymmetrical diester of a substituted diglycolic acid is obtained, which when alcoholized gives dimethyl diglycolate and methyl glycolate.

*Example 3.*—The esters described in Examples 1 and 2 or obtained by any of the reactions described above may be converted to the corresponding acid by hydrolysis in accord with any suitable hydrolysis process such as:

311 parts of dimethyl diglycolate, 350 parts of water are heated under reflux in the presence or absence of a small amount, say from .01 to 1.0% of a hydrolysis catalyst such as sulfuric acid, phosphoric acid or the like. The methanol formed during the hydrolysis is distilled off, and after about two hours the hydrolysis is approximately 95% complete, although it may be continued for some time thereafter if desired to give more complete conversion of the ester to the acid. The hydrolyzed product is evaporated on a steam bath until crystals appear; it is then cooled and centrifuged for the separation of the crystallized acid. The first crop of crystals contains about 58%, and the second crop a total of approximately 78% of the acid originally present as ester. By hydrolysis in this manner with additional recrystallization, a recovery of approximately 96% of the total acid present can be readily obtained.

While the examples refer particularly to carrying out the synthesis in a more or less discontinuous manner, the synthesis may likewise be effected in a continuous manner by passing the ester and catalyst through a reaction zone either cocurrent or countercurrent to the flow of carbon monoxide, the rate of flow being adjusted to realize the desired degree of the reaction. The carbon monoxide should be maintained as in the process described in the examples at a suitable pressure, and the temperature of the continuous reaction should be held in the prescribed range by suitable heating means.

Because of the corrosive nature of the catalyst and the reactants, it is advisable to carry out the process in glass, silica, porcelain-lined or glass-lined vessels, or in vessels the inner surfaces of which should be constructed of such corrosion-resistant metals as silver, chromium, stainless steel or the like.

In order to reduce the amount of by-products formed, it has been found advisable to return the by-products to the reaction. This can be done in either the batchwise or the continuous process, and it will be found that by returning them their production is suppressed to such an extent that an excellent overall conversion of the (alkoxymethoxy) acetic acid ester to diglycolic acid or its esters can be realized.

I claim:

1. A process for the preparation of a diester of diglycolic acid which comprises subjecting an ester of an (alkoxymethoxy) acetic acid to a reaction with carbon monoxide in the presence of a boron fluoride catalyst at a temperature between 20 and 350° C. and a pressure between 5 and 1500 atmospheres neutralizing the catalyst, heating the resulting mixture with an alkyl alcohol and recovering the diester of diglycolic acid by fractionation.

2. The process of claim 1 in which the ester is (methoxymethoxy) acetic acid methyl ester.

3. The process of claim 1 in which the ester is (ethoxymethoxy) acetic acid ethyl ester.

4. The process of claim 1 in which the ester is (isobutoxymethoxyl) acetic acid isobutyl ester.

5. A process for the preparation of dimethyl diglycolate which comprises heating (methoxymethoxy) acetic acid methyl ester in the pressure of boron trifluoride as the catalyst under a temperature between 20 and 350° C. and carbon monoxide pressure between 5 and 1500 atmospheres, neutralizing the catalyst with an alkali, heating the neutralized product with methanol in the presence of sulfuric acid as the catalyst and after neutralizing the sulfuric acid catalyst recovering the dimethyl diglycolate produced by distillation.

6. A process for the preparation of dimethyl diglycolate which comprises heating (methoxymethoxy) acetic acid methyl ester in the presence of boron fluoride as the catalyst at a temperature between 75 and 100° C. and under carbon monoxide pressure between 200 and 700 atmospheres, neutralizing the boron trifluoride with sodium methoxide, heating the neutralized reaction mixture with methanol at approximately the boiling point of the reaction mixture, distilling and recovering the dimethyl diglycolate.

7. A process for the preparation of a diester of diglycolic acid which comprises heating an (alkoxymethoxy) acetic acid ester in the presence of boron fluoride as the catalyst under a temperature between 20 and 350° C. and carbon monoxide pressure between 5 and 1500 atmospheres, neutralizing the catalyst with an alkali, heating the neutralized product with an alkyl alcohol in the presence of sulfuric acid and after neutralizing the sulfuric acid, recovering the dialkyl diglycolate produced by distillation.

8. A process for the preparation of a diester of diglycolic acid which comprises heating an (alkoxymethoxy) acetic acid ester in the presence of boron fluoride as the catalyst under a temperature between 75 and 100° C. and carbon monoxide pressure between 200 and 700 atmospheres, neutralizing the catalyst with sodium methoxide, heating the neutralized product with an alkyl alcohol in the presence of sulfuric acid and after neutralizing the sulfuric acid, recovering the dialkyl diglycolate produced by distillation.

DONALD J. LODER.